United States Patent [19]

Lita

[11] Patent Number: 5,796,941
[45] Date of Patent: Aug. 18, 1998

[54] METHOD FOR SUPERVISING SOFTWARE EXECUTION IN A LICENSE RESTRICTED ENVIRONMENT

[75] Inventor: Mihai N. Lita, South San Francisco, Calif.

[73] Assignee: Catalyst Semiconductor, Inc., Sunnyvale, Calif.

[21] Appl. No.: 708,941

[22] Filed: Sep. 6, 1996

[51] Int. Cl.⁶ .................................................. G06F 11/00
[52] U.S. Cl. .................... 395/187.01; 395/185.1; 395/184.01; 395/675
[58] Field of Search ........................... 395/186, 187.01, 395/188.01, 182.09, 182.1, 182.11, 670, 675, 185.1, 185.01, 184.01; 380/3, 4, 23, 25

[56] References Cited

U.S. PATENT DOCUMENTS

| | | | |
|---|---|---|---|
| 4,853,872 | 8/1989 | Shimoi | 364/300 |
| 4,924,378 | 5/1990 | Hershey et al. | 364/200 |
| 4,937,864 | 6/1990 | Robert et al. | 380/4 |
| 5,023,907 | 6/1991 | Johnson et al. | 380/4 |
| 5,175,847 | 12/1992 | Mellott | 395/182.1 |
| 5,204,897 | 4/1993 | Wyman | 380/4 |
| 5,260,999 | 11/1993 | Wyman | 380/4 |
| 5,363,503 | 11/1994 | Gleeson | 395/182.08 |
| 5,375,206 | 12/1994 | Hunter et al. | 395/700 |
| 5,390,297 | 2/1995 | Barber et al. | 395/186 |
| 5,548,645 | 8/1996 | Ananda | 380/4 |
| 5,553,143 | 9/1996 | Ross et al. | 380/25 |
| 5,568,552 | 10/1996 | Davis | 380/4 |
| 5,579,222 | 11/1996 | Baines et al. | 395/712 |

OTHER PUBLICATIONS

Dracula® Integrated Circuit (IC) Layout Verification System, Cadence Design Systems, Inc., Jul. 1991.

*Primary Examiner*—Robert W. Beausoliel, Jr.
*Assistant Examiner*—Joseph E. Palys
*Attorney, Agent, or Firm*—Hickman Beyer & Weaver, LLP

[57] ABSTRACT

A method for supervising the execution of a job in a license restricted environment is disclosed. According to the license restricted environment, some networked machines are licensed for a first type of processing and other machines are licensed for a second (or other) types of processing. In executing a job that requires processing portions or segments of both the first and second types of processing, when the job begins processing the job using the first types of processing on a suitably licensed machine and then fails when attempting to process the job using the second types of processing on the same machine because of a license violation. The method for supervising operates in an automated fashion to detect the stoppage of the job due to license failure and to resume the remaining portions or segments of the job for processing using the second types of processing on a suitably licensed machine.

21 Claims, 12 Drawing Sheets

STAGES

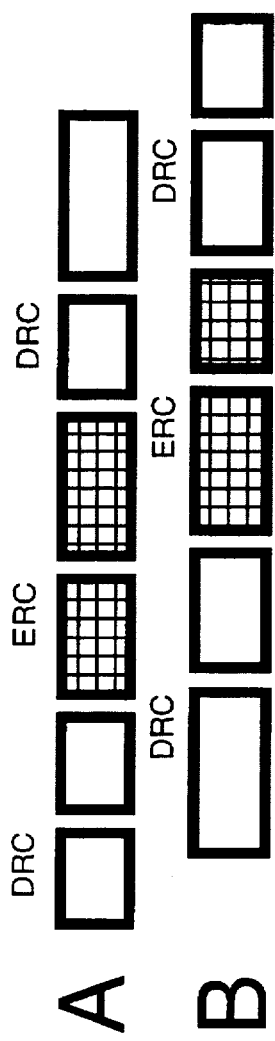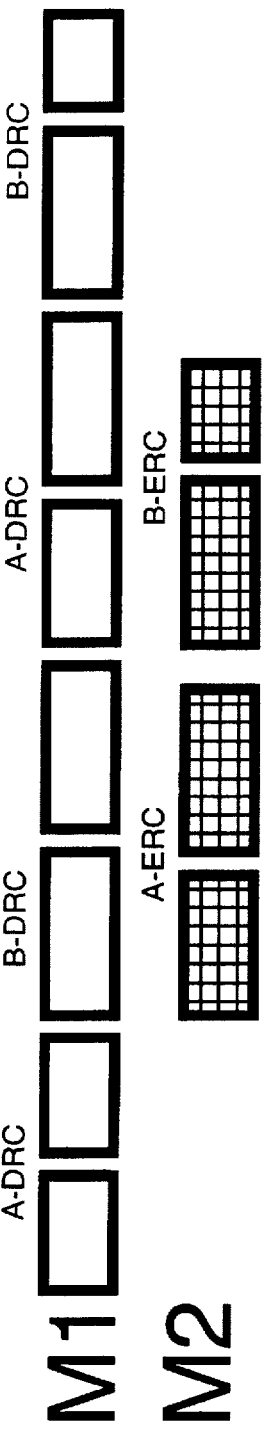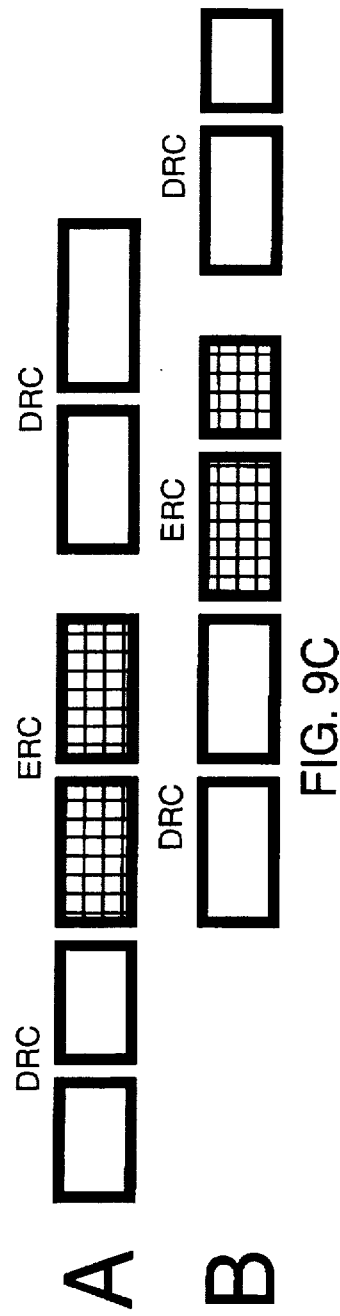

METHOD FOR SUPERVISING SOFTWARE EXECUTION IN A LICENSE RESTRICTED ENVIRONMENT

BACKGROUND OF THE INVENTION

1. Field of the Invention

The present invention relates to software execution, and more particularly, to software execution in a license restricted environment.

2. Description of the Related Art

Software licenses can take many forms. One type of software license is known as a fixed license and is typically designed to allow a licensed software program to execute on a specific computer. Another type of license is known as a floating license. A floating license is a license that can float to one or more computers in a network environment. In the field of computer-aided design and testing of electronic circuits and devices, fixed and floating licenses are commonly used. The cost associated with a fixed license is known to be less expensive than a comparable floating license. These types of licensing structures can impede the utilization of the licensed software.

In the semiconductor field, it is very common to perform design verification on computer-designed semiconductor devices prior to their fabrication. The object of the verification testing is to identify places in the design where certain rules are violated. In the case of software that is designed for the purpose of performing such verifications on integrated circuit designs, it is common for the verification software to have a variety of different modules in which different types of checking or verification is performed. The operators of the software are then free to invoke only those modules it desires and thereby perform the particular verification checks it desires. Typically, the vendors of the verification software license these modules individually to businesses.

Hence, if a business obtains fixed licenses to use various modules of the verification software on specific computers, it is not uncommon that some computers will have a license to certain modules and other computers will have licenses for other of the modules. An example of such verification software is the DRACULA® integrated circuit layout verification system produced by Cadence Design Systems, Inc. of San Jose, Calif. The DRACULA® verification system is a complete set of integrated capabilities for verifying integrated circuit layout design. The DRACULA® verification system has a number of modules, including the modules of: design rules checker (DRC), electrical rules checker (ERC), layout versus layout (LVL), and layout versus schematic consistency checker (LVS). For more information of the DRACULA® verification system, see e.g., DRACULA Reference Manual, Volumes 1-3, by Cadence Design Systems, Inc. Accordingly, many business that have licensed the DRACULA® verification system have various modules licensed for use on different computers.

Consequently, when a verification job is begun by an operator on a particular computer, the job will usually begin processing but will then often times fail because that particular computer lacks the necessary license to operate other modules requested by the job. When the job fails, the operator is required to go to the computer where the job was initiated, and attempt to determine why in fact the job was not completed. Then, the operator has to try to understand what caused the job to stop prematurely and at what point the job should be restarted. These manual tasks placed on an operator are time consuming, burdensome, and otherwise unsatisfactory.

Thus, there is a need for techniques to improve the way in which jobs can be processed in a software restricted environment.

SUMMARY OF THE INVENTION

Broadly speaking, the invention relates to a method for supervising the execution of a job in a license restricted environment. According to the invention, a supervisor machine or process monitors execution of a job on a machine to detect stoppage due to license failure, determines whether the reason for the failure is a license violation, and then submits the remaining portions or segments of the job for processing on another machine. The job is thus completed using multiple machines that are licensed for the processing necessary to carry out the job.

The invention can be implemented in numerous ways, including as a method, an apparatus, a system or a computer-readable media. Several embodiments of the invention are described below.

As a computer-implemented method for performing a job in a restricted software license environment having at least two machines, with each of the machines capable of being licensed for certain processing, an embodiment of the invention includes the operations of: submitting the job for processing on a first machine; determining whether the job stopped before completion due to a license violation; determining at what point in the job the job was stopped when it is determined that the job has stopped before completion; and thereafter resuming the job to a second machine to continue processing the job at the point just after the point where the job was determined to have stopped.

Optionally, in the situation in which the job includes a number of portions, with a first portion of the job requiring the first class of operations and a second portion of the job requiring the second class of operations, and where the restricted software license environment includes a plurality of licensed machines, with each machine being licensed for at least a first class of operations or a second class of operations, the computer-implemented method may further include the operations of: identifying the licensed machines that are licensed to perform the second class of operations; determining the processing load on each of the identified licensed machines; selecting one of the identified licensed machines based on the determined processing loads; and forwarding the second portion of the job to the selected one of the identified licensed machines for processing thereon.

As a computer-implemented method for performing a job in a restricted software license environment having a plurality of server machines licensed for certain types of processing, another embodiment of the invention includes the operations of: receiving a job to be processed; determining a first type of license needed to process at least an initial portion of the job; selecting a first server machine to process at least the initial portion of the job from the server machines having the first type of license; submitting the job for processing on the first server machine; monitoring the processing of the job on the first server machine; determining whether the job being processed on the first server machine stopped before completion due to a license violation; determining at what point in the job the job was stopped when it is determined that the job has stopped before completion; determining a second type of license needed to process at least a next portion of the job; selecting a second server machine to process at least the next portion of the job from the server machines having the second type of license; and submitting the job for processing on the second server machine beginning at the point in the job where the job previously stopped. Optionally, the selecting of the second server machine may include the operations of: identifying the server machines having the second type of license; determining the processing load on each of the identified server machines; and selecting one of the identified licensed machines based on the determined processing loads.

As a computer-implemented method for performing a job in a restricted software license environment having a plurality of machines capable of being licensed for certain types of processing, yet another embodiment of the invention includes the operations of: receiving a job to be processed, the job including a plurality of segments; determining a first type of license needed to process at least an initial segment of the job; selecting a first machine to process at least the initial segment of the job from the machines capable of having the first type of license; submitting the initial segment of the job for processing on the first machine; monitoring the processing of the initial segment of the job on the first machine; determining when the first machine has completed processing of the initial segment of the job; determining a second type of license needed to process at least a next segment of the job; selecting a second machine to process at least the next segment of the job from the machines capable of having the second type of license; and submitting the next segment of the job for processing on the second machine. Optionally, the selecting of the second machine may include the operations of: identifying the machines having second type of license; determining the processing load on each of the identified machines; and selecting one of the identified machines based on the determined processing loads.

As a computer-implemented method for performing a job in a restricted software license environment, the software license environment having a plurality of server machines and at least one floating license for use by the server machines, still another embodiment of the invention includes the operations of: receiving a job to be processed, the job including a plurality of independently executable modules; determining processing loads for each of the server machines; selecting a first server machine to process at least an initial module of the job based on the processing loads; providing a first floating license to the first server machine; and submitting the job for processing on the first server machine.

As a computer readable media containing program instructions for performing a job in a restricted software license environment, with the software license environment having at least two machines, and each of the machines capable of being licensed for certain processing, an embodiment of the invention includes: first computer readable code devices for submitting the job for processing on a first machine; second computer readable code devices for determining whether the job stopped before completion due to a license violation; third computer readable code devices for determining at what point in the job the job was stopped when it is determined that the job has stopped before completion; and fourth computer readable code devices for resuming the job to a second machine to continue processing the job at the point just after the point where the job was determined to have stopped.

The advantages of the invention are numerous. One advantage of the invention is that jobs are able to be processes in an automatic fashion thereby substantially eliminating the burden placed on the operator. Another advantage of the invention is that fixed licenses on networked machines are able to operate much like floating licenses. Yet another advantage of the invention is that the performance of job processing is able to be substantially improved.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which:

FIGS. 9a–9c are diagrams illustrating a two machine (M1 and M2) system in which verification of jobs A and B are performed in accordance with an example of the invention.

DETAILED DESCRIPTION OF THE INVENTION

A method for supervising the execution of a job in a license restricted environment is disclosed. According to the method, a supervisor machine or process monitors processing of a job on a machine to detect stoppage due to license failure, determines whether the reason for the failure is a license violation, and resumes the remaining portions or segments of the job for processing on another machine. The job is thus completed using multiple machines that are licensed for the necessary processing of the job.

Embodiments of the invention are discussed below with reference to FIGS. 1–6. However, those skilled in the art will readily appreciate that the detailed description given herein with respect to these figures is for explanatory purposes as the invention extends beyond these limited embodiments.

Figure 1:
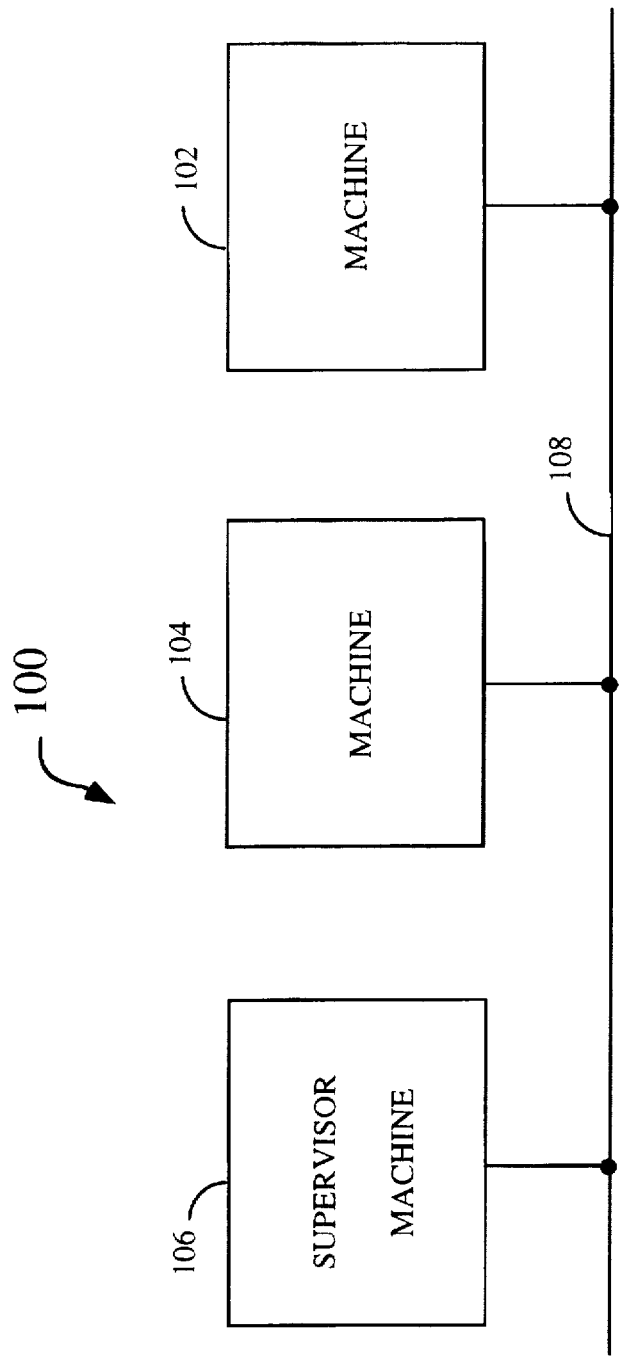
FIG. 1 illustrates a block diagram of a computer system according a first embodiment of the invention.

FIG. 1 illustrates a block diagram of a computer system 100 according a first embodiment of the invention. The computer system 100 includes machines 102 and 104 as well as a supervisor machine 106. The machines 102, 104 and 106 are preferably general purpose computers such as personal computers (e.g., IBM compatible personal computers) or workstation computers. These machines 102, 104 and 106 are also coupled to a bus 108 so that the machines 102, 104 and 106 can transmit data and control signals between one another. The bus 108 can be a specialized bus for the computer system 100 or a portion of larger network that couples to other computers.

In accordance with the invention, a job is processed by the computer system 100 using either or both of the machines 102 and 104. A job is a request or directive to a machine to perform various processing tasks using one or more certain software programs. The machines 102 and 104 are licensed to perform various processing tasks associated with the certain software programs. For example, in the case of design verification, a job might be to check a design layout file for an integrated circuit to identify design or electrical rules violations. The design layout file could be stored on any machine coupled to the bus 108. The supervisor machine 106 operates to submit the job to one of the machines 102 and 104 and then to monitor its processing. When the processing stops on the particular machine, the supervisor machine 106 then determines whether the job has been completed. If the job has been completed, then no additional processing is needed for the job. On the other hand, when the job stops before being completed, the supervisor machine 106 then operates to resume the job to the other of the machines. For example, if the job was initially submitted to the machine 104, then in the case in which the jobs stops before being completed, the job is resumed to the machine 106. Presumably, the machine 104 would be capable of then completing the job. However, the supervisor machine 106 can again monitor whether the job stops before completion and again resume the job as necessary to the machine 102 or some other machine.

One advantage of the supervision (e.g., monitoring and controlling functions) carried out by the supervisor machine 106 according to the invention is that when the job stops prematurely (i.e., prior to completion) on a given machine due to the lack of a necessary license to process the remaining portion of the job, then the supervising machine 106 can automatically resume the remaining portion of the job to the other machine to perform the processing now required by the job. Presumably, the other machine would have the needed license to perform the processing now required by the job. Consequently, the amount of human interaction required to complete a job is significantly reduced by the invention. In particular, when the job stops due to a license violation, the invention causes the job to be continued on another machine that has the appropriate license. As a result, the job ends up being completed without the human interaction being required in most cases. This is extremely advantageous when these jobs involve complicated processing that takes several hours to complete.

According to the invention, a job can be initiated and then not attended to by an operator. For example, the invention facilitates overnight processing of jobs which would conventionally not complete without frequent attention from the operator. Previously, with overnight processing, in many cases, the job would not be completed by the next morning because it would have stopped due to a license violation on the machine on which the job was initiated. The failures to complete the job overnight is not only bothersome to the user or operator but also undesirably results in utilization of computing resources and manpower during normal business hours.

Thus, the invention is particularly beneficial to a restricted license software environment in which a job can require more than one license. For example, a first portion or module of a job could require a first type of license and a second portion or module of the job could require a second type of license. Such licensing situations are common in the computer-assisted design verification field where a job will often times require performance of different processing modules (software programs) that each have their own license requirements. One example is the DRACULA® integrated circuit layout verification system produced by Cadence Design Systems, Inc. of San Jose, Calif., in which a job can include one or more modules such as design rules checker (DRC), electrical rules checker (ERC), layout versus layout (LVL), layout versus schematic consistency checker (LVS), at least some of which are separately licensed. Although one could fully license all the needed processing modules on a specific machine, this is an inefficient use of resources, particularly with respect to multiple operators or multiple jobs. Furthermore, industry tends not to fully license one particular machine but instead tends to use partial licenses for various often times different processing modules on several different machines.

Figure 2:
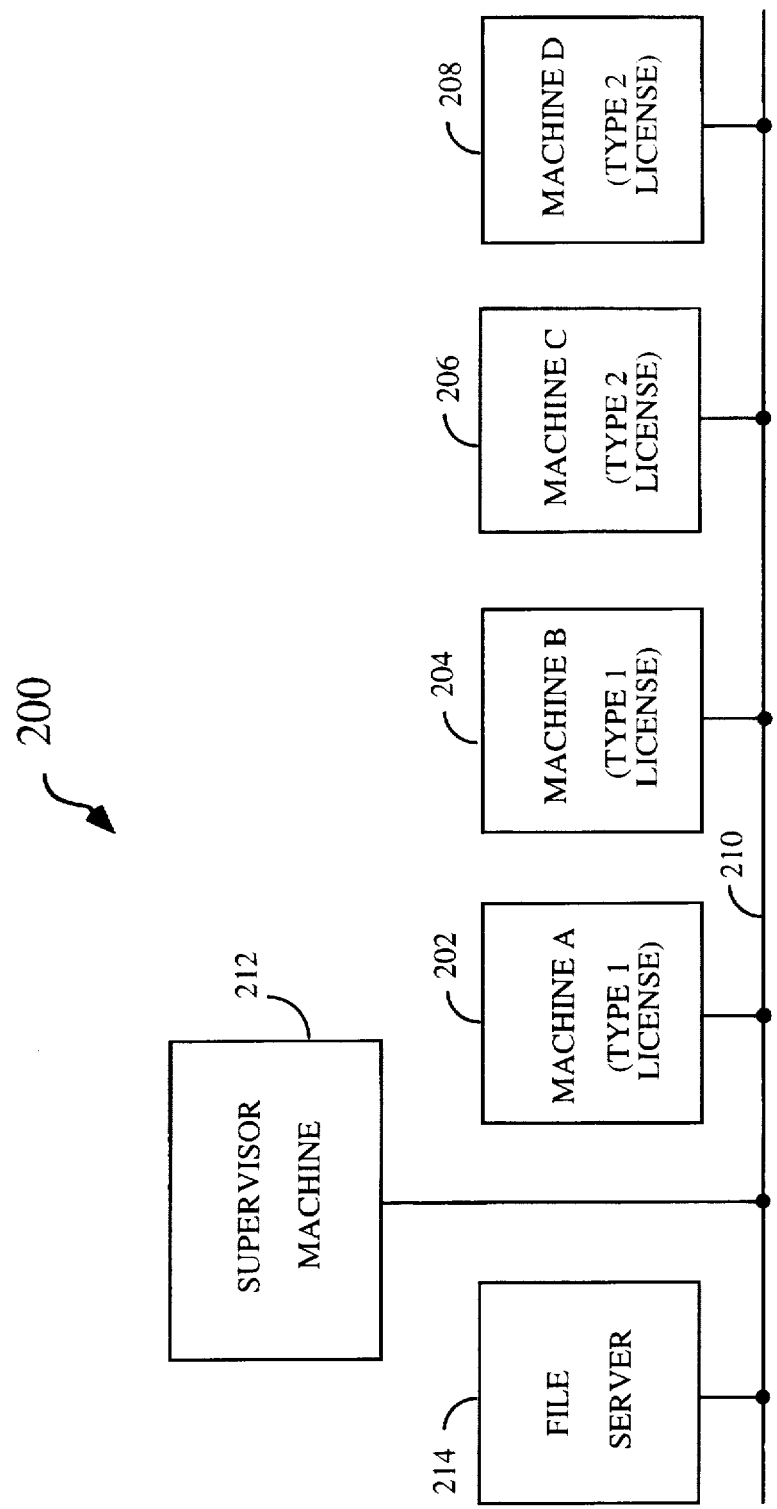
FIG. 2 is a block diagram of a computer system according to a second embodiment of the invention.

FIG. 2 is a block diagram of a computer system 200 according to a second embodiment of the invention. The computer system 200 includes various machines (i.e., computers). In particular, the computer system 200 includes machine A 202, machine B 204, machine C 206, and machine D 208. Further, the computer system 200 includes a supervisor machine 212 and a file server 214. The machines 202–208 are coupled to a bus 210. The supervisor machine 212 and the file server 214 are also coupled to the bus 210. The bus 210 can be a dedicated bus for the various machines illustrated in FIG. 2 or part of a larger bus or network. As illustrated in FIG. 2, the machines 202–208 of the computer system 200 each have either a type 1 license or a type 2 license. These licenses are assumed to be fixed licenses for the particular machines. Specifically, the machine A 202 and the machine B 204 each have a type 1 license, and the machine C 206 and the machine D 208 each have a type 2 license. In other words, the machines A and B 202 and 204 can perform processing for software that requires a type 1 license. Similarly, the machines C and D 206 and 208 can perform processing for software that requires a type 2 license.

In accordance with the invention, a job is processed by the computer system 200 much the same way it was with the computer system 100 of FIG. 1. One difference is that multiple machine are available for performing the various processing tasks and thus the invention is able to intelligently select the appropriate machine for certain processing tasks. Generally, the selection of the appropriate machine operates to select the machine with the appropriate license that is the least loaded (e.g., processing load). Another difference is that the computer system 200 includes the file server 214. The file server 214, or any other machine coupled to the bus 210, can store an input data file and/or an output data file used in executing the job. The operation of the computer system 200 in accordance with the invention is explained with reference to FIGS. 5A and 5B below.

Figure 3A:
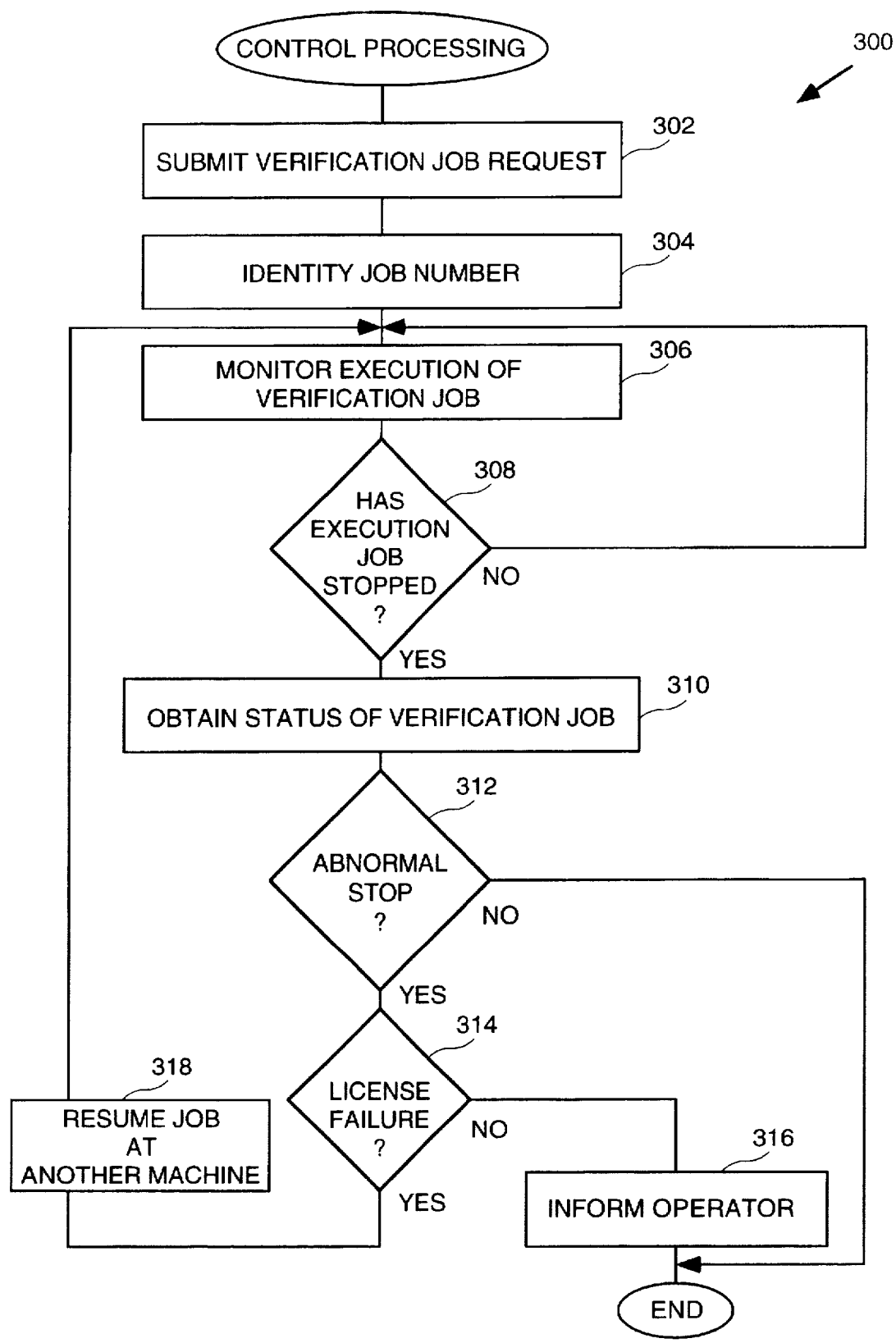
FIGS. 3A and 3B are flow diagrams illustrating control processing according to an embodiment of the invention.
Figure 3B:
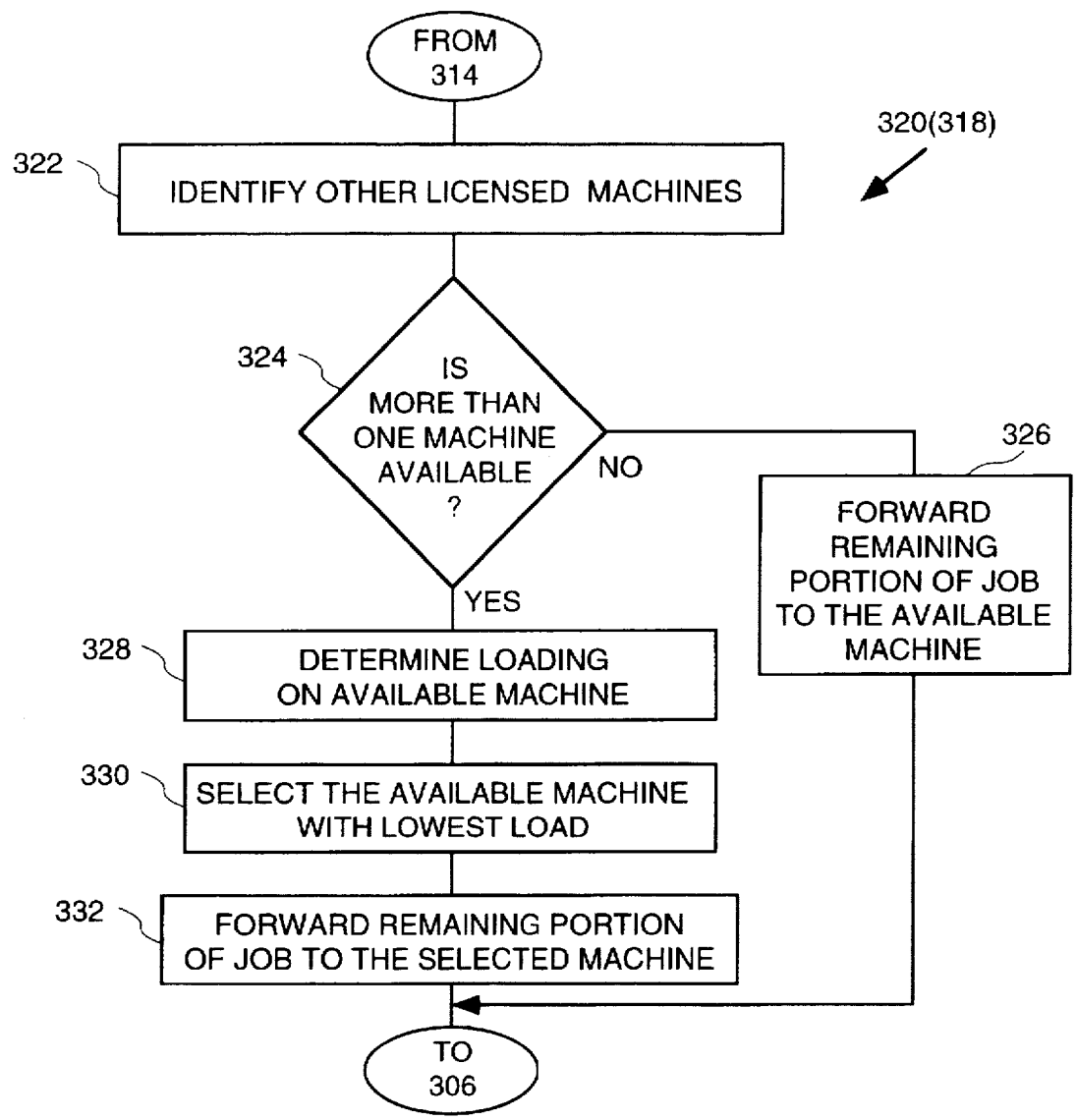

FIGS. 3A and 3B are flow diagrams illustrating control processing 300 according to an embodiment of the invention. In one embodiment, the control processing 300 is performed by the supervisor machine 106 or the supervisor machine 212. The exemplary job being processed in FIGS. 3A and 3B is a verification job. However, it should be noted that more generally, the job can be any job being executed in a license restricted environment.

The control processing 300 begins after an operator issues a job verification request. The controlled processing 300 initially submits 302 the verification job request to a particular machine (e.g., computer or server). The particular machine then executes software, in this case verification software, to process the verification job. Then, the control processing 300 identifies 304 a job number for the job that has been submitted. For example, the job number can refer to a process ID number. Next, the execution of the verification job on the particular machine is monitored 306. The monitoring 306 of the machine is utilized to determine whether the machine is executing the verification job as identified by its job number. For example, in a UNIX based machine, a system table would indicate those processes (including the verification job) running on the machine. A decision block 308 then determines whether execution of the job has stopped. If the decision block 308 determines that the job has not yet stopped, then the control processing 300 returns to repeat block 306 in accordance with a certain polling rate. Nevertheless, once the decision block 308 determines that the execution of the job has stopped, then the control processing 300 obtains 310 the status of the verification job. In this case, the status of the verification can be obtained by interpreting a log file that is generated by the verification software.

A decision block 312 then determines whether the verification job has stopped due to some abnormality. If the decision block 312 determines that the verification job stopped only after it was fully completed, then the control processing 300 is complete and ends. On the other hand, when the decision block 312 determines that the verification job stopped because of some abnormality, a decision block 314 determines whether the abnormality is due to a license failure. When the decision block 314 determines that the abnormality was not license failure, then the operator is informed of the irregular stop of the job. Following block 316, the control processing 300 ends and thereafter requires user interaction by the operator. Alternatively, when the decision block 314 determines that the reason in which the verification job stopped was because of a license failure, then the balance of the job is resumed 318 at another machine. Following block 318, the control processing 300 returns to repeat block 306 and subsequent blocks.

As a first example consider the following example of the control processing 300 with respect to the computer system 100 illustrated in FIG. 1 with the assumption that the verification job (e.g., verification job 400 or 402 in FIGS. 4A and 4B) is initially submitted to the machine 104. The supervisor machine 106 monitors the execution of the verification job on the machine 104. In this example, the execution of the verification job fails or stops part way through its processing. Once the supervisor machine 106 determines that the processing of the verification job has stopped on the machine 104, then supervisor machine 106 reviews the log file produced by the verification software on the machine 104 that executes the verification job. Assume, for this example, that the log file is stored on the supervisor machine 106 to determine the status of the verification job. In reviewing the log file, the supervisor machine 106 determines whether the job was fully completed or stopped prior to being to fully completed. The supervisor machine 106 also determines whether a license failure was the reason that the job stopped early. If the reason for the early stop was not a license failure, then the supervisor machine 106 can initiate notification to the operator. The notification would inform the operator that the verification job has stopped and has not completed properly and that attention is required. If, however, the reason for the early stop was a license failure, then the supervisor machine 106 determines where to resume the verification job. In this example, the verification job is forwarded to the machine 102 for execution of the verification job at the determined restart position. Of course, it is assumed that the machine 102 would have the required license that the machine 104 lacked and thus caused the job to fail on the machine 104 midway through its processing.

FIG. 3B is a flow diagram of resume processing 320 according to an embodiment of the invention. The resume processing 320 describes operations performed by the block 318 in FIG. 3A.

The resume processing 320 first identifies 322 other licensed machines that are available to perform verification processing. The identification here preferably checks the available machines to determine whether or not they are licensed for any of the modules of the verification software. Next, a decision block 324 determines whether there is more than one machine available. Here, to be available the machine must have the appropriate type of license to perform the verification job at the determined restart position. If there is only one machine available, then the remaining portion of the job is forwarded 326 to the available machine. Then, following block 326, the resume processing 320 would be completed and the processing would return to repeat block 306 and subsequent blocks in FIG. 3A. On the other hand, when the decision block 324 determines that there are more than one machines available to process the remaining portion of the job, then the resume processing 320 performs some additional processing. Specifically, the load on the available machines is determined 328. Then, the available machine with the lowest load is selected 330. Thereafter, the remaining portion of the job is forwarded 332 to the selected machine. Following block 332, the resume processing 320 is complete and then returns to repeat block 306 and subsequent blocks in FIG. 3A.

Figure 4A:
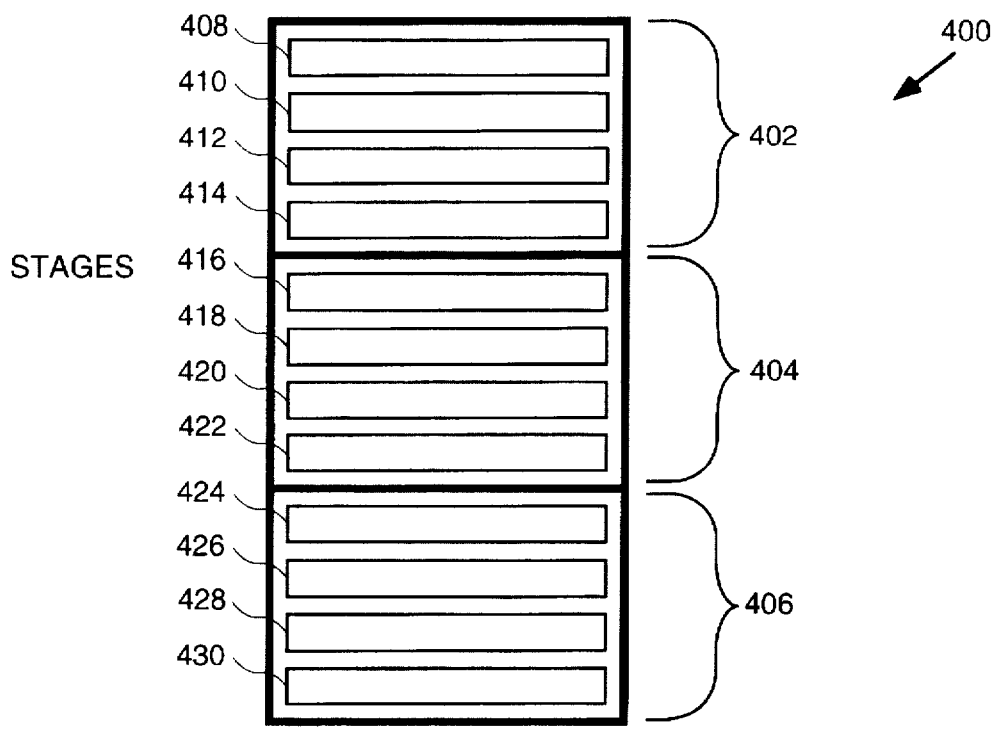
FIGS. 4A and 4B are diagrams of exemplary jobs to be processed.
Figure 4B:
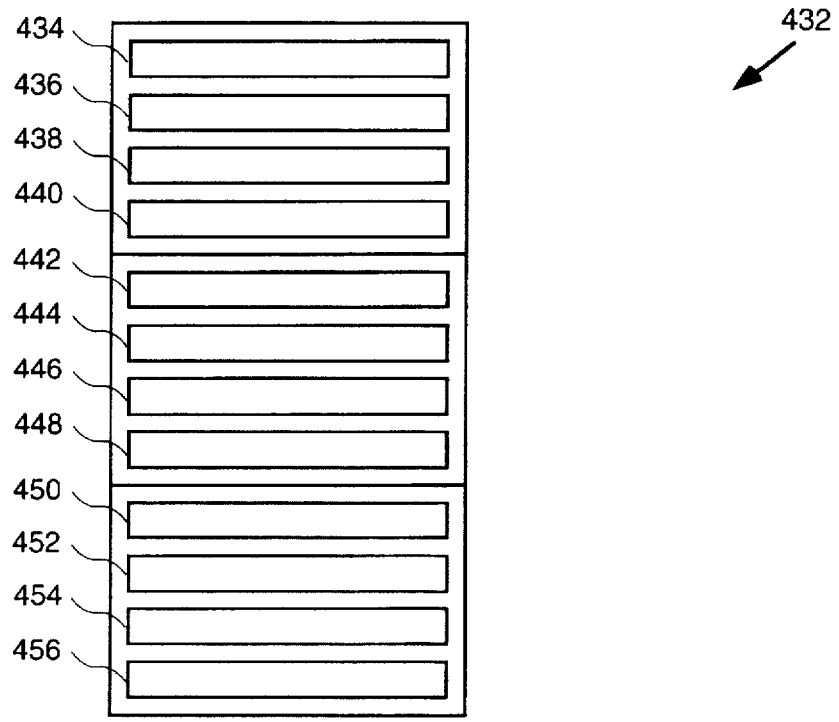

FIGS. 4A and 4B are diagrams illustrating two views of the same exemplary job (e.g., verification job) that is to be processed. As previously noted, a job is a processing task that is to be performed by certain independently executable software modules.

In FIG. 4A, a job 400 is shown as having a first portion 402, a second portion 404, and a third portion 406. These portions 402–406 are defined according to their license functionality. For example, with respect to the DRACULA system, the first portion 402 could be a DRC module, the second portion 404 could be a ERC module, and the third portion 406 could be another DRC module. Each of the portions 402–406 can also be referred to as a module. The portions 402–406 also each contain stages (or steps). Within a given portion 402–406, the stages therein require the same type of license. In particular, the portion 402 includes stages 408–414. The second portion 404 includes stages 416–422. The third portion 406 includes stages 424–430.

With respect to the first example discussed above, when the job 400 is submitted for processing on the machine 104 that has the license type required by stages 408–414, the processing of the job 400 will stop at the beginning of stage 416 of the second portion 404. This is because the stages 416–422 of the second portion 404 require a license type not supported by the machine 104. Instead, in this example, the machine 102 supports the license type required by stages 416–422. Accordingly, the supervisor machine 106 will direct the job 400 beginning at stage 416 to be processed by the machine 102. However, at the beginning of stage 424, the job 400 will again stop because the machine 102 lacks the necessary license type to perform stages 424–430 of the third portion 406. In other words, the stages 424–430 require the type license not supported by the machine 102 but instead supported by the machine 104. Hence, the supervisor machine 106 will again resume the job 400 to the machine 104 but this time beginning at stage 424. Thereafter, the job 400 completes on the machine 104.

FIG. 4B is a diagram of a job 432 having a number of stages 434-456. The job 432 is arranged only by the stage (or step), each stage is an independently executable code block. FIG. 4B is another view of the job 400 of FIG. 4A but has as its primary element the stage. When processing the job 432, the individual stages are separately and individually processed. Because the individual stages are handled separately and individually monitored and processed, the distribution of the processing load over the available machines can be better distributed or balanced. An example of the processing of jobs having a structure like the job 432 in FIG. 4B is provided in FIG. 6.

Figure 5A:
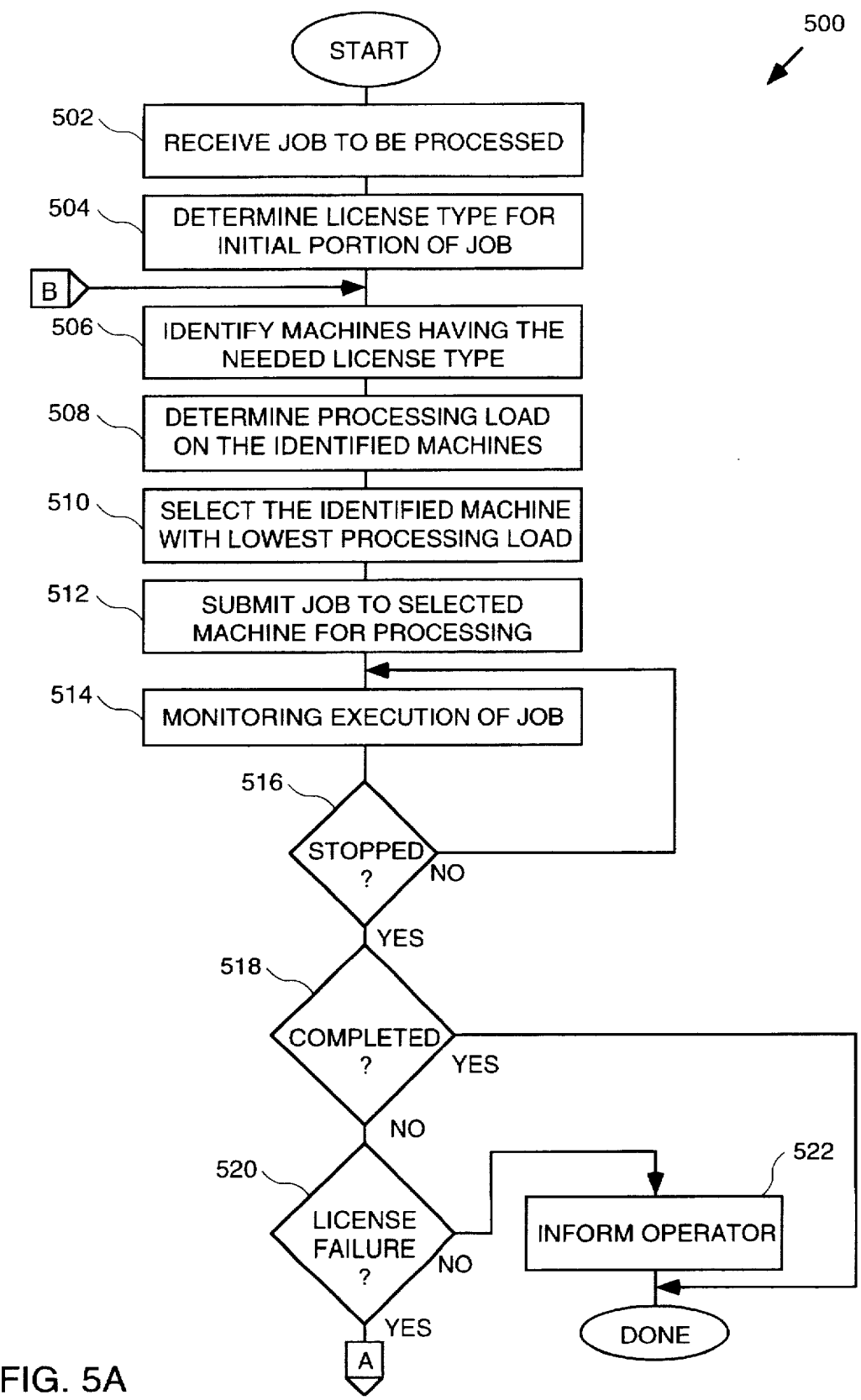
FIGS. 5A and 5B are flow diagrams of control processing according to another embodiment of the invention.
Figure 5B:
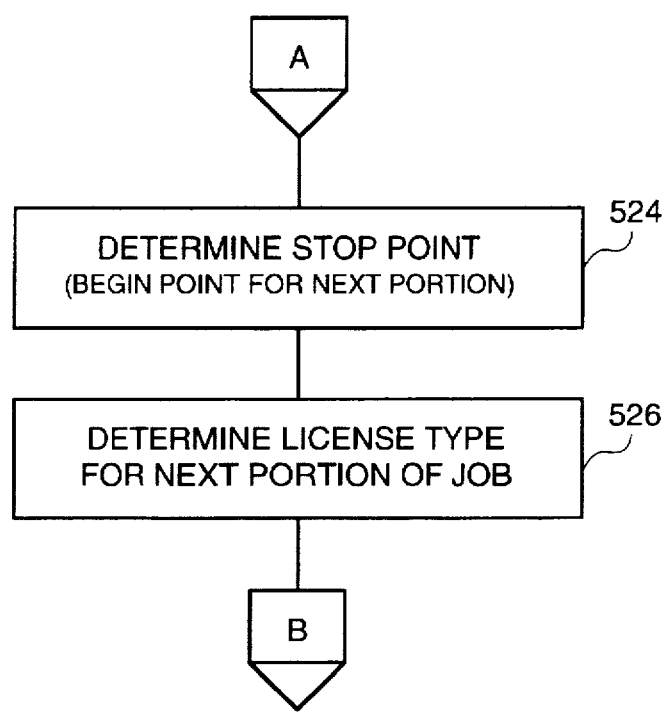

FIGS. 5A and 5B are flow diagrams of control processing 500 according to another embodiment of the invention. The control processing 500 is preferably performed by the supervisor machine 106 of FIG. 1 or the supervisor machine 212 of FIG. 2.

The control processing 500 initially receives 502 a job to be processed. For example, in the case of design verification, the job would be a verification job intended to check an integrated circuit design to identify design flaws. Then, the control processing 500 determines 504 the license type required by the initial portion of the job. For example, with respect to FIG. 4A, the license type for the first portion 402 of the job 400 would be determined 504. Alternatively, with respect to FIG. 4B, the license type for the stage 434 of the job 432 would be determined 504.

Next, the machines having the needed license type are identified 506. Here, the machines made available to the control processing 500 are checked to determine whether they have the license type needed by the portion of the job to be processed. Those machines that have the needed license type are identified 506. For example, with respect to FIG. 2, if the license type needed is a type 1 license, then the machines 202 and 204 of the computer system 200 would be available. The processing load on the identified machines is then determined 508. For example, the processing load can be determined by the percentage of CPU usage on the identified machines. For example, in the case of a UNIX based machine, the UNIX command "iostat" can be used. Thereafter, one of the identified machines having the lowest processing load is selected 510. Beyond the processing load, the control processing 500 could also weight the processing jobs so as to establish some priority between multiple job. The selection 510 in this case would then consider the weighted processing loads.

The job is then submitted 512 to the selected machine for processing. In other words, the selected machine begins execution of the job. As soon as the execution of the job begins, the control processing 500 monitors 514 the execution of the job on the selected machine. A decision block 516 then checks to see whether or not the execution of the job has stopped. If the execution of the job has not yet stopped, the control processing 500 returns to repeat block 514 until the execution of the job does stop. Once the decision block 516 determines that the execution of the job has stopped, then the decision block 518 determines whether the job has been completed. If the job has been completed, then the control processing 500 is complete and ends. However, when the decision block 518 determines that the job has not completed, then a decision block 520 determines whether a license failure has occurred. If a license failure has not occurred, then the operator is informed 522 of the irregular stoppage of the job prior to its completion. For example, the operator can be automatically notified by telephone, electronic mail or pager. Following block 522, the control processing 500 is complete and ends. The operator may also be similarly notified of a normal completion of the job.

On the other hand, when the decision block 520 determines that the stoppage of the job is due to a license failure, a stop point for the job is determined 524. The stop point is used to indicate where the execution job should be resumed; hence, the stop point is also the begin point for a next portion. As an example, the log file produced by the processing of the job provides information that certain stages of the job have completed. Hence, the determination of the stop point is at the stage in which the job stops and follows the last stage that has completed. Next, the license type for a next portion is determined 526. For example, with respect to the job 400 illustrated in FIG. 4A, the first stop point would be at the beginning of the stage 416 and the license type for the next portion of the job would be the license type required by the stages 416-422 of the second portion 404. Following block 526, the control processing 500 returns to repeat blocks 506 and subsequent blocks. Eventually, the job is determined by the decision block 518 to have completed and then the control processing 500 is complete and ends.

Although the previously described embodiments illustrates the processing of the job in essentially portions of the job in which each portion is typically associated with a particular license type. This type of job is represented by the job 400 illustrated in FIG. 4A. However, it may be advantageous to process the job in smaller units of stages and not the larger portions. The job 432 illustrated in FIG. 4B is representative of jobs arranged in stages and without portions. In some cases, a stage can be supported by multiple license types which allows for additional flexibility in choosing an appropriate machine to process the stage. As an example, a stage could be a common module capable of being executed by multiple license types. However, to utilize such a stage-based approach, monitoring statements should be added between the stages so as to allow the supervising machine to regain control over the remaining stages of the job so as to resume the next stage to the appropriate machine. In the case of the DRACULA® integrated circuit layout verification system, a script is produced by a preprocessor (PDRACULA). This DRACULA script can be thought of as a job for this implementation. The monitoring statements could be inserted into a DRACULA script produced by a preprocessor (PDRACULA) of the DRACULA® verification system. For more information of the DRACULA® verification system, see e.g., .. .. DRACULA Reference Manual, Volumes 1-3, by Cadence Design Systems, Inc., which is hereby incorporated by reference. Alternatively, second preprocessor can be used to modify the DRACULA script to insert the monitoring statements. In this case, the monitoring statements would invoke the supervisor processing of the job as previously described so as to determine the appropriate machine to receive the next stage considering license type and loading, and then submitting the stage to be processing on the machine determined to be appropriate.

Figure 6:
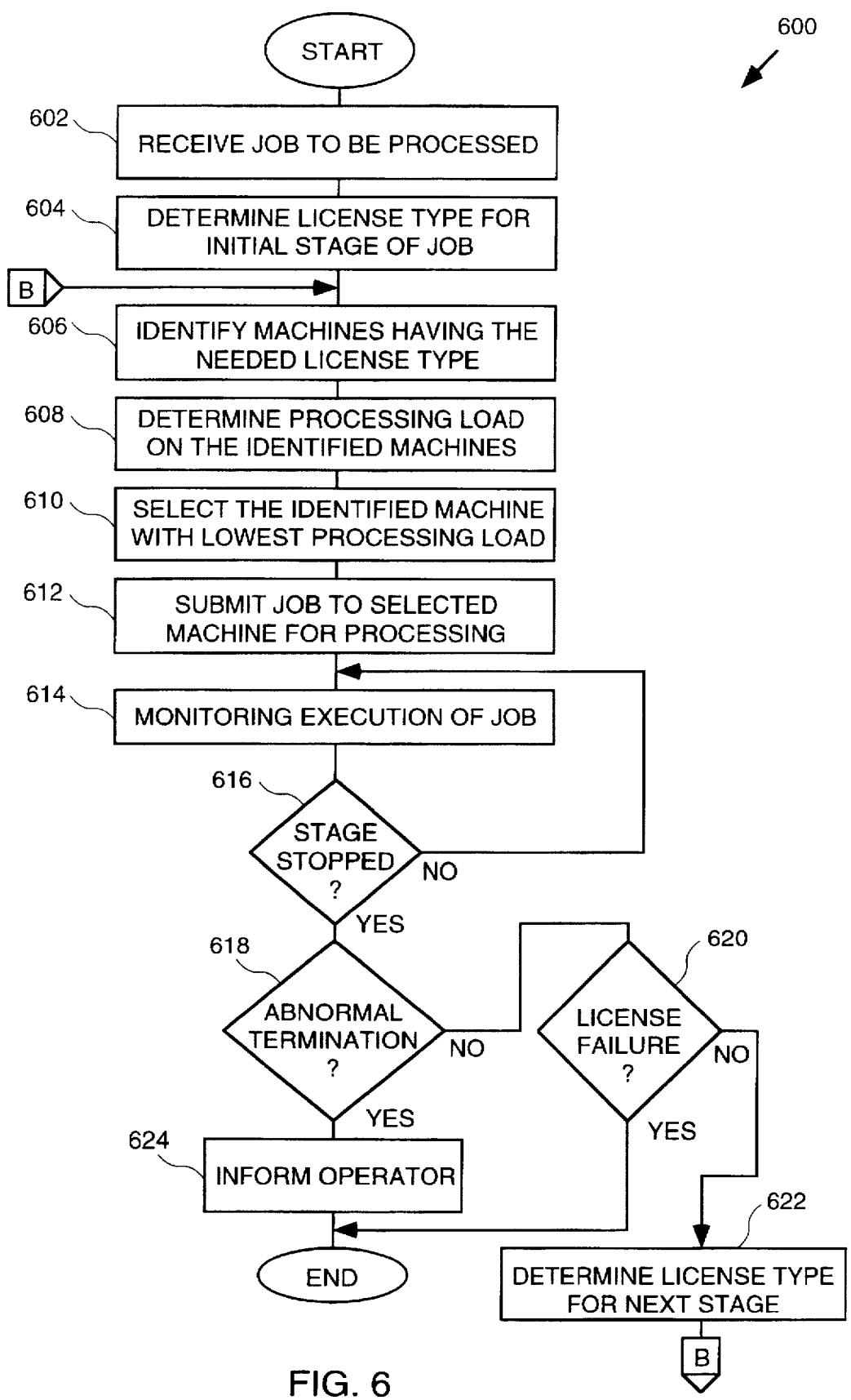
FIG. 6 is a flow diagram of control processing according to still another embodiment of the invention.

FIG. 6 is a flow diagram of control processing 600 according to still another embodiment of the invention. The control processing 600 is preferably performed by the supervisor machine 106 of FIG. 1 or the supervisor machine 212 of FIG. 2. The blocks 602-614 of the control processing are essentially the same as the blocks 502-514 and are therefore not again discussed. While periodically monitoring 614 the execution of the stage of the job, a decision blocks determines whether the processing of the stage has stopped 616. Until the processing of the stage stops, the control processing returns to repeat block 614. Once the processing of the stage has stopped, a decision block 618 determines whether the stoppage of the processing was due to an abnormal termination. If the stoppage was not due to abnormal termination, then a decision block 620 determines whether the job has been completed. The job is completed when all the stages of the job have been processed. When the job has not yet been completed, the license type for the next stage of the job is determined 622 and then the control processing 600 returns to repeat block 606 and subsequent blocks. On the other hand, when the job has been completed, then the control processing 600 is complete and ends. Further, in the case in which the decision block 618 determines that stoppage was due to abnormal termination, then the operator is informed of the abnormal stoppage and thereafter the control processing 600 is complete and ends.

Figure 7:
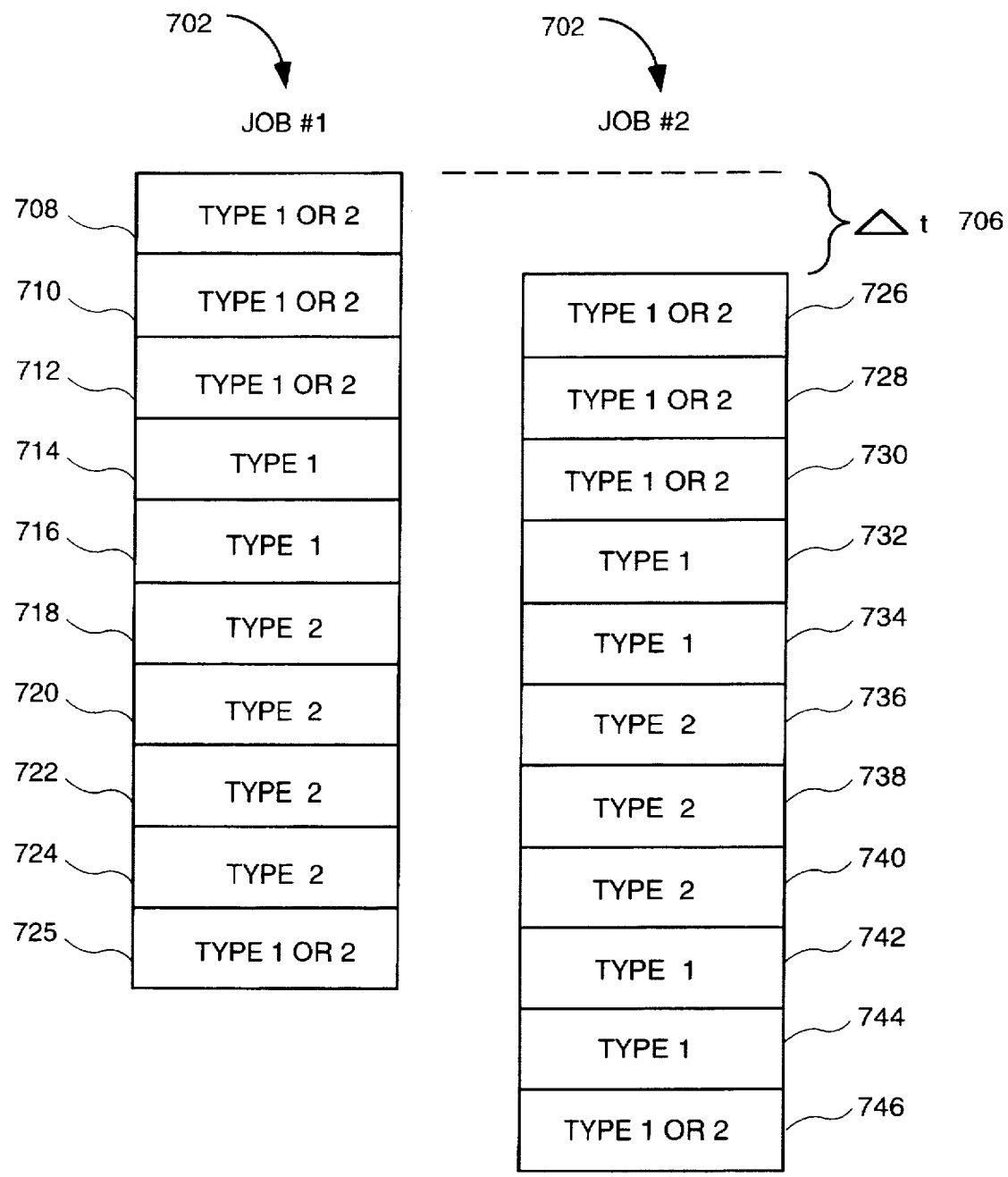
FIG. 7 illustrates two different jobs started at two different times and to be concurrently processed by a computer system.

FIG. 7 illustrates two different jobs started at two different times and to be concurrently processed by a computer system. Both of the jobs are processed a stage at a time. A first job (Job #1) 702 is initially started and a job (Job #2) 704 is started at some time duration ($\Delta t$) 706 thereafter. The job 702 includes stages 708–725, and each of the stages 708–725 require either a type 1 license, a type 2 license, or a type 1 or type 2 license. The job 704 includes stages 726–746, and each of the stages 708–725 require either a type 1 license, a type 2 license, or a type 1 or type 2 license.

An example of the processing carried out by the invention in performing these jobs 702 and 704 on the computer system 100 illustrated in FIG. 1, is discuss below. For this example, it is assumed that the machine 104 has a type 1 license and the machine 102 has a type 2 license. Initially, the stage 708 of the first job (job #1) 702 can be processed on either machine 102 or 104. Hence, the stage 708 is forwarded by the supervisor machine 106 to the machine 104 which is assumed to have the lower processing load at this time. Then, after the completion of the stage 708, the supervisor machine 106 then submits the block 710 to the machine 104 which is again assumed to have the lower processing load. Then, during the processing of the stage 710, the second job (job #2) 704 begins with stage 726. Given that the machine 104 is busy with the stage 710, the stage 726 is submitted by the supervisor machine 106 to the machine 102. Then, after the completion of the stage 710, the supervisor machine 106 submits the stage 712 to the machine 104 because at this time the machine 102 is busy. Also, after the completion of the stage 726, the stage 728 would be again processed by the machine 102.

After the stage 712 completes, the supervisor machine 106 submits the stage 714 to the machine 104 because only the machine 104 has the needed license. Then, the supervisor machine 106 submits the stage 730 to the machine 102. After the completion of the stage 714, the stage 716 is submitted to the machine 104. Then, as of the completion of the stage 730, the supervisor machine 106 has to wait to submit the stage 732 to the machine 104 because the type 1 license on the machine 104 is currently being used by the stage 716. After the stage 716 completes, the supervisor machine 106 can then submit the stage 718 to the machine 102 (which supports the type 2 license) and also submit the stage 732 to the machine 104 (which supports the type 1 license). Then, the supervisor machine 106 can sequentially submit the processing stages 720–724 for the job 702 to the machine 102. The supervisor machine 106 can also process the stage 734 on the machine 104, but for the processing of stages 736–740 must wait until the machine 102 (with the type 2 license) becomes available. The machine 102 becomes available after the processing of stage 724 or 725 depending on implementation. At that time, the processing of stages 736–740 can be submitted by the supervisor machine 106 to the machine 102 for processing. Thereafter, the first job (job #1) 702 would have completed, thus making machines 102 and 104 both available to the processing of the second job (job #2) 704. Hence, the machine 104 would be available for processing stages 742 and 744, and subsequently either machine 102 or 104 could be used to process the stage 746 depending upon the respective loads.

There are many advantages provided by the invention. One advantage of the invention is that jobs are able to be processes in an automatic fashion thereby substantially eliminating the burden placed on the operator. Another advantage of the invention is that fixed licenses on networked machines are able to operate much like more costly floating licenses. Yet another advantage of the invention is that the performance of job processing is able to be substantially improved.

The invention is also useful for overcoming abnormal termination of the job processing software due to "bugs" in the job processing software. The supervision provided by a supervisor machine can recognize predetermined characteristics of a defined "bug" and then in some cases resume the processing of the job in a manner that overcomes the bug.

Figure 8:
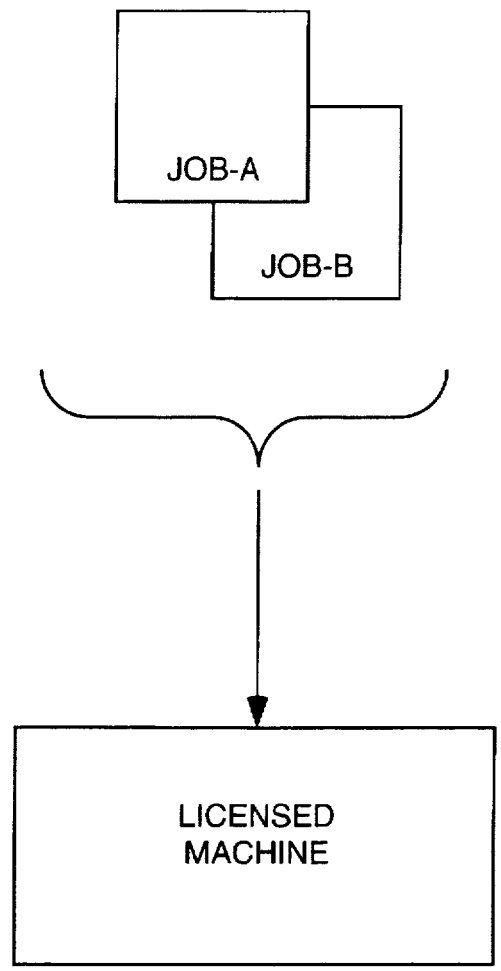
FIG. 8 illustrates a prior art example of two jobs (Job-A and Job-B) being processed by a single licensed machine.

FIG. 8 illustrates a prior art example of two jobs (Job-A and job-B) being processed by a single licensed machine. The total processing time would be the sum of the individual processing times of Job-A and Job-B. This is referred to as the conventional processing time.

FIGS. 9a–9c are diagrams illustrating a two machine (M1 and M2) system in which verification of jobs A and B are performed in accordance with an example of the invention. Machine M1 is licensed for DRC processing and machine M2 is licensed for ERC processing. FIG. 9a illustrates the job structures for the jobs A and B. FIG. 9b illustrates a timing diagram of the allocation of the jobs to the machines M1 and M2, and FIG. 9c illustrates a timing diagram of the execution of the jobs. The total processing time is 9/12 of the conventional processing time. The processing time improvement provided by the invention is provided by allocating the jobs to the appropriate machines using portions (functional division of the jobs) in accordance with the invention.

Figure 10A:
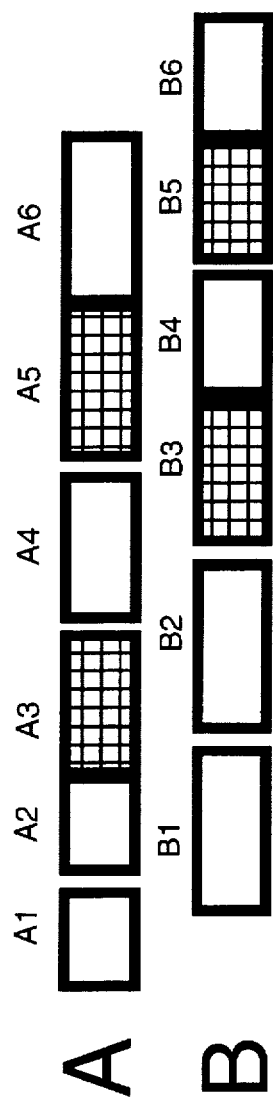
FIGS. 10a–10c are diagrams illustrating a two machine (M1 and M2) system in which verification of jobs A and B are performed in accordance with another example of the invention.
Figure 10B:
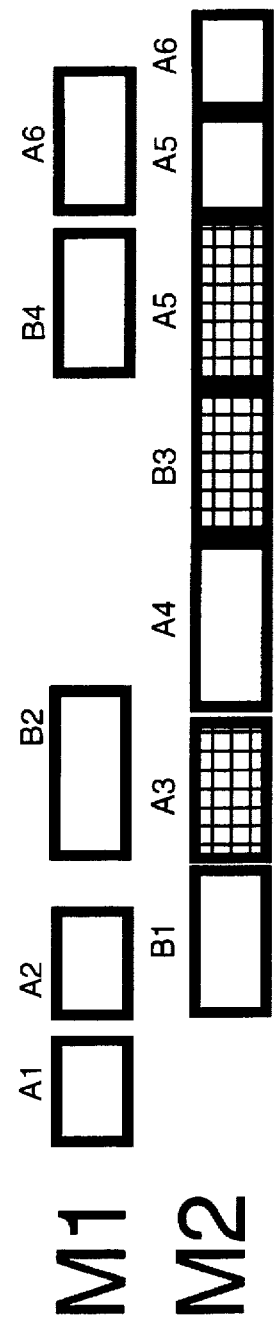
Figure 10C:
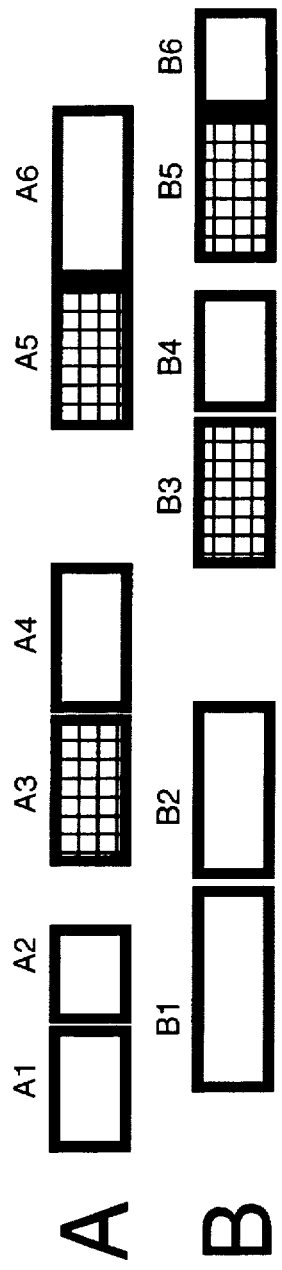

FIGS. 10a–10c are diagrams illustrating a two machine (M1 and M2) system in which verification of jobs A and B are performed in accordance with another example of the invention. Machine M1 is licensed for ERC processing and machine M2 is licensed for DRC processing. FIG. 10a illustrates the job structures for the jobs A and B. FIG. 10b illustrates a timing diagram of the allocation of the jobs to the machines M1 and M2, and FIG. 11c illustrates a timing diagram of the execution of the jobs. The total processing time is 7/12 of the conventional processing time. The processing time improvement provided by the invention is provided by dynamically allocating the jobs to the appropriate machines using the more fundamental unit of stages in accordance with the invention.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A computer-implemented method for performing a job in a restricted software license environment, the software license environment having at least two machines, each of the machines capable of being licensed for at least a first class of operations or a second class of operations, and the job includes a number of portions, a first portion of the job requires the first class of operations and a second portion of the job requires the second class of operations, said computer-implemented method comprising:

(a) submitting the job for processing on a first machine;

(b) determining whether the job stopped before completion due to a license violation;

(c) determining at what point in the job the job was stopped when it is determined that the job has stopped before completion; and (d) thereafter resuming the job to a second machine to continue processing the job at the point just after the point where the job was determined to have stopped, said resuming includes at least the operations of, identifying the licensed machines that are licensed to perform the second class of operations;

selecting one of the identified licensed machines; and forwarding the second portion of the job to the selected one of the identified licensed machines for processing thereon.

2. A computer-implemented method as recited in claim 1, wherein said resuming (d) includes the operation of:

determining the processing load on each of the identified licensed machines, and wherein said selecting operates to select one of the identified licensed machines based on the determined processing loads.

3. A computer-implemented method as recited in claim 2, wherein each of the portions contain at least one independently executable code block.

4. A computer-implemented method as recited in claim 1, wherein said method is initiated by an operator, and wherein said method further comprises:

(e) notifying the operator when the job has stopped for some reason other than the license failure.

5. A computer-implemented method as recited in claim 1, wherein processing of the job produces a log file, and wherein said determining (c) uses the log file to determine at what point in the job the job was stopped.

6. A computer-implemented method for performing a job in a restricted software license environment, the software license environment having a plurality of server machines licensed for certain types of processing, said computer-implemented method comprising:

(a) receiving a job to be processed;

(b) determining a first type of license needed to process at least an initial portion of the job;

(c) selecting a first server machine to process at least the initial portion of the job from the server machines having the first type of license;

(d) submitting the job for processing on the first server machine;

(e) monitoring the processing of the job on the first server machine;

(f) determining whether the job being processed on the first server machine stopped before completion due to a license violation;

(g) determining at what point in the job the job was stopped when it is determined that the job has stopped before completion;

(h) determining a second type of license needed to process at least a next portion of the job;

(i) selecting a second server machine to process at least the next portion of the job from the server machines having the second type of license; and (j) submitting the job for processing on the second server machine beginning at the point in the job where the job previously stopped.

7. A computer-implemented method as recited in claim 6, wherein said selecting (i) includes the operations of:

(i1) identifying the server machines having the second type of license;

(i2) determining the processing load on each of the identified server machines; and (i3) selecting one of the identified licensed machines based on the determined processing loads.

8. A computer-implemented method as recited in claim 7, wherein said selecting (i3) selects the one of the identified licensed machines having the lowest processing load.

9. A computer-implemented method as recited in claim 7, wherein said method is initiated by an operator, and wherein said method further comprises:

(k) notifying the operator when the job has stopped before completion for some reason other than the license violation.

10. A computer-implemented method as recited in claim 7, wherein processing of the job produces a log file, and wherein said determining (g) uses the log file to determine at what point in the job the job was stopped.

11. A computer-implemented method as recited in claim 6, wherein said method further comprises:

(k) monitoring the processing of the job on the second server machine;

(l) determining whether the job being processed on the second server machine stopped before completion due to a license violation;

(m) determining at what point in the job the job was stopped when it is determined that the job has stopped before completion;

(n) determining a third type of license needed to process at least a next portion of the job;

(o) selecting a third server machine to process at least the next portion of the job from the server machines having the third type of license; and (p) submitting the job for processing on the third server machine beginning at the point in the job where the job previously stopped.

12. A computer-implemented method for performing a job in a restricted software license environment, the software license environment having a plurality of machines capable of being licensed for certain types of processing, said computer-implemented method comprising:

(a) receiving a job to be processed, the job including a plurality of segments;

(b) determining a first type of license needed to process at least an initial segment of the job;

(c) selecting a first machine to process at least the initial segment of the job from the machines capable of having the first type of license;

(d) submitting the initial segment of the job for processing on the first machine;

(e) monitoring the processing of the initial segment of the job on the first machine;

(f) determining when the first machine has completed processing of the initial segment of the job;

(g) determining a second type of license needed to process at least a next segment of the job;

(h) selecting a second machine to process at least the next segment of the job from the machines capable of having the second type of license; and (i) submitting the next segment of the job for processing on the second machine.

13. A computer-implemented method as recited in claim 12, wherein the segments of the job are sequentially processed, independently executable code blocks.

14. A computer-implemented method as recited in claim 12, wherein one or more of the segments represent a portion or a module of the job.

15. A computer-implemented method as recited in claim 12, wherein said selecting (h) of the second machine includes the operations of:

(h1) identifying the machines capable of having second type of license;

(h2) determining the processing load on each of the identified machines; and (h3) selecting one of the identified machines based on the determined processing loads.

16. A computer-implemented method as recited in claim 15, wherein said selecting (h3) selects the one of the identified machines having the lowest processing load.

17. A computer-implemented method as recited in claim 12, wherein said method is initiated by an operator, and wherein said method further comprises:

(j) notifying the operator when the job has stopped before completion for some reason other than the license violation.

18. A computer-implemented method for performing a job in a restricted software license environment, the software license environment having a plurality of server machines and at least one floating license for use by the server machines, said computer-implemented method comprising:

(a) receiving a job to be processed, the job including a plurality of independently executable modules;

(b) determining processing loads for each of the server machines;

(c) selecting a first server machine to process at least an initial module of the job based on the processing loads;

(d) providing a first floating license to the first server machine;

(e) submitting the job for processing on the first server machine;

(f) monitoring the processing of the job on the first server machine;

(g) determining whether the job being processed on the first server machine stopped before completion due to a license violation;

(h) determining at what point in the job the job was stopped when it is determined that the job has stopped before completion;

(i) determining a second floating license needed to process at least a module portion of the job;

(j) determining processing loads for each of the server machines;

(k) selecting a second server machine to process at least the next module of the job based on the processing loads; and (l) resuming the job for processing on the second server machine beginning at the point in the job where the job previously stopped.

19. A computer-implemented method as recited in claim 18, wherein said selecting of the first server machine selects the server machine having the lowest processing load.

20. A computer readable media containing program instructions for performing a job in a restricted software license environment, the restricted software license environment includes a plurality of licensed machines, each machine capable of being licensed for at least a first class of operations or a second class of operations, and wherein the job includes a number of portions, a first portion of the job requires the first class of operations and a second portion of the job requires the second class of operations, said computer readable media comprising:

first computer readable code devices for submitting the job for processing on a first machine;

second computer readable code devices for determining whether the job stopped before completion due to a license violation;

third computer readable code devices for determining at what point in the job the job was stopped when it is determined that the job has stopped before completion; and fourth computer readable code devices for resuming the job to a second machine to continue processing the job at the point just after the point where the job was determined to have stopped, said fourth computer readable code devices include at least, computer readable code devices for identifying the licensed machines that are licensed to perform the second class of operations;

computer readable code devices for selecting one of the identified licensed machines; and computer readable code devices for forwarding the second portion of the job to the selected one of the identified licensed machines for processing thereon.

21. A computer readable media as recited in claim 20, wherein said computer readable code devices for selecting operate to select one of the identified licensed machines based on processing loads.

* * * * *